Aug. 19, 1969  R. K. BARLTROP  3,462,660
MONITORING OF CONTROL SYSTEMS
Filed June 30, 1966  2 Sheets-Sheet 1

# United States Patent Office 3,462,660
Patented Aug. 19, 1969

3,462,660
MONITORING OF CONTROL SYSTEMS
Richard Kenneth Barltrop, London, England, assignor to Elliott Brothers (London) Limited, London, England
Filed June 30, 1966, Ser. No. 561,968
Claims priority, application Great Britain, June 30, 1965, 27,627/65
Int. Cl. H02p 1/54, 5/46, 7/68
U.S. Cl. 318—18                    7 Claims

ABSTRACT OF THE DISCLOSURE

A control system such as an aircraft automatic pilot having a control channel and a standby channel, the standby channel being switched to take over control if a fault develops in the control channel, and compensating means in the standby channel effective to compensate, while the control channel is operative, for error signals in the standby channel.

---

Figure 1:
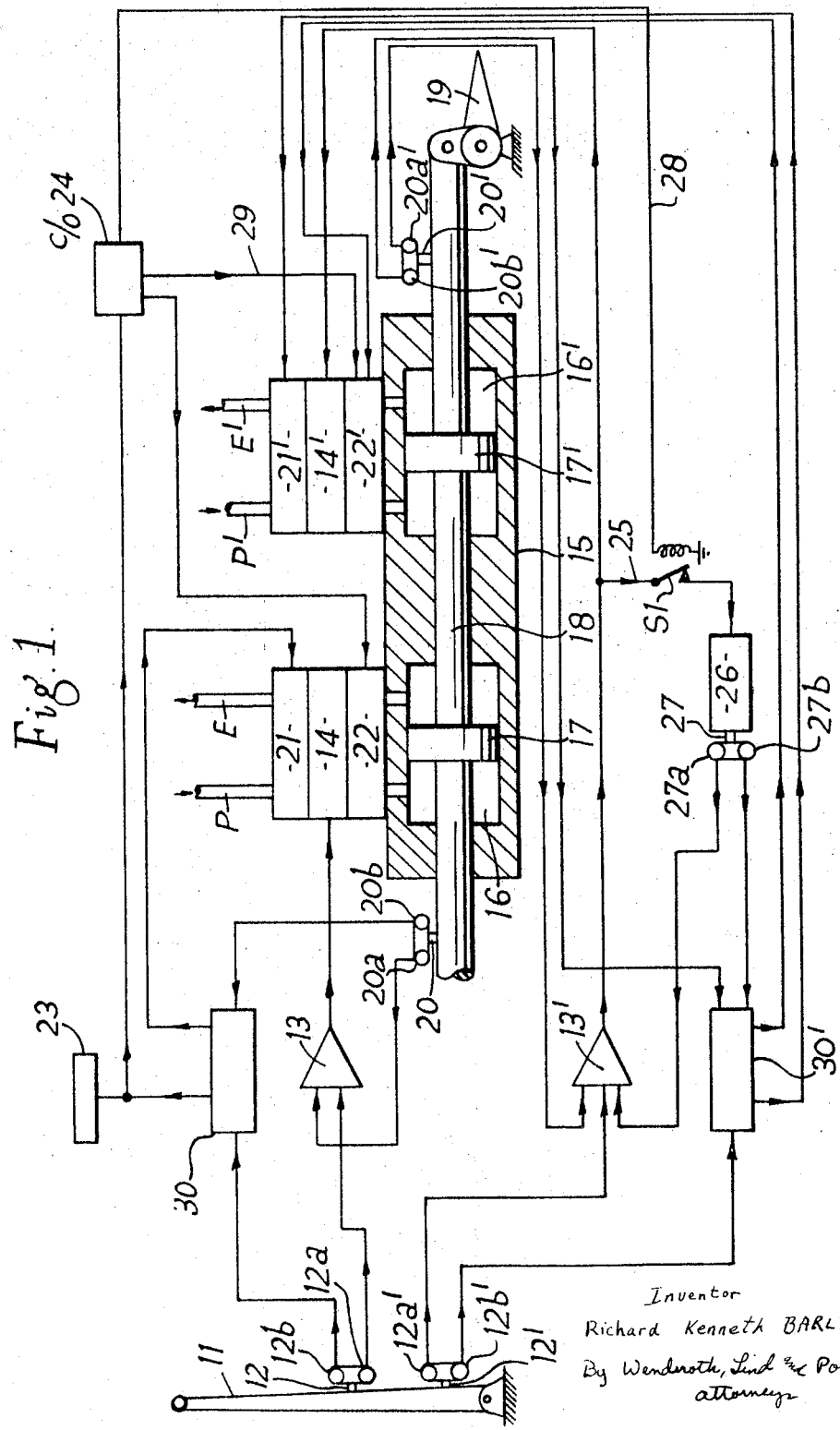

The invention relates to the monitoring of control systems.

According to one aspect of the invention a control system comprises at least two separate control means, one for controlling the positioning of a member and the other operates in a standby mode, changeover means connected between said two control means for causing, when activated, said other control means to take over control of the positioning of the member, separate monitoring means coupled with each control means, each monitoring means comprising a summing amplifier; required position signal producing means connected to the summing amplifier for supplying thereto a signal representative of a required position of said member; actual position signal producing means coupled between said member and the summing amplifier for supplying thereto a signal representative of the actual position of the member; and comparator means coupled to said signal producing means and receiving inputs representative of said signals and coupled to said two control means for causing the control means to become inoperative and the other control means to become operative upon the determination of a predetermined error between said signals, the system further comprising compensating means coupled to the monitoring means of said other control means, for compensating while said one control means is operating for errors between said signals resulting for incorrect positioning of said member under control of said one control means.

Each control means may comprise a servo loop control arrangement to which the signals representative of a demand input are fed, positional feedback signals for the servo loop control arrangement being derived from the position of the member, and each monitoring means comprises a comparator which compares the demand input signal with the feedback signal.

Preferably said other control means further includes and integrator, a switch being provided to supply the integrator, when said other control means is in the standby mode, with the position control output signal from the associated servo loop control arrangement, the output from the integrator being fed as a further input to the associated comparator to compensate for any error which may be detected in the comparator.

The integrated position control output signal may also be utilised as a feedback signal for the servo loop control arrangement constituting said other control means whilst said other control means is in the standby mode, whereby the output of this servo loop control arrangement is reduced to zero.

Eliminator means may be provided capable of eliminating any datum errors produced in the integrator whilst said other control means is operating in a standby mode, said eliminator means becoming operable when said other control means is caused to take over control of positioning said member.

The integrator means may be in the form of a servo motor which is driven by the position control output signal, the integrated signal or signals being derived from a pick-off or pick-offs associated with the shaft of the motor.

Figure 2:
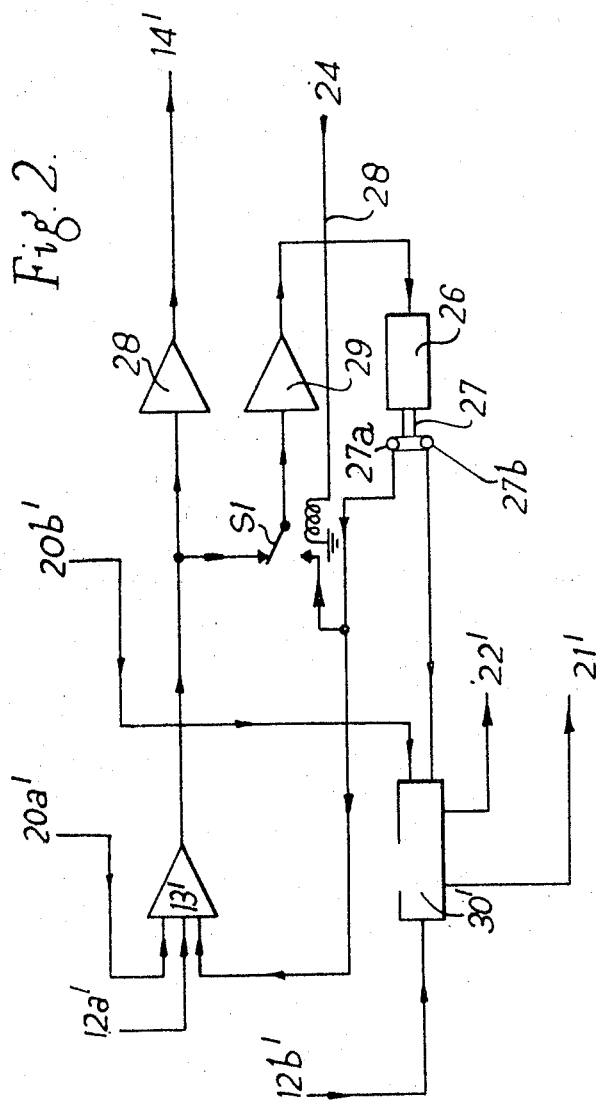

The foregoing and further features of the invention will become apparent from the following description of a preferred embodiment thereof with reference to the drawings accompanying the specification, in which:

FIGURE 1 shows a diagrammatic representation of a duplicate monitored control system for controlling the elevator of an aircraft, and FIGURE 2 shows a block schematic representation of a portion of the system of FIGURE 1, which portion includes a modification.

Referring now to FIGURE 1 there is shown a manually operable control lever 11 having associated therewith a pick-off device 12 which senses the position of the manually operable lever 11 and is connected, via its portion 12a to provide corresponding electrical position signals as an input to an amplifier 13. The output of amplifier 13 is connected so as to provide positional control signals to a torque motor/control valve combination 14 associated with a hydraulic actuator 15.

The hydraulic actuator 15 includes a first cylinder 16 containing a piston 17 rigidly mounted on a piston rod 18 which is mechanically linked to control the position of an elevator 19. A pick-off device 20 which is arranged to provide electrical output signals representative of the position of the piston rod 18 is connected, via its portion 20a, so as to feed such positional signals as a further input to amplifier 13. Thus there is provided a servo loop system, the output of amplifier 13 being reduced to zero when the piston rod 18 reaches a required position.

The portion 12b of pick-off also produces electrical output signals representative of the position of the manually operable lever 11 which are fed as one input to a comparator 30. A further portion 20b of the pick-off 20 which also provides electrical output signals representative of the position of the piston rod 18 is connected so as to provide a further input for the comparator 30. The comparator 30 includes delay means arranged to provide a transfer function equivalent to the transfer function of the control system and hence the two sets of electrical positional signals that are in fact compared in the comparator effectively have similar amplitudes when the arrangement is operating correctly and no faults are present. The comparator 30 is connected so as to control the operation of a throttle valve 21 which is connected between the torque motor/control valve combination 14 and pressure input and exhaust lines referenced P and E respectively which provide the hydraulic power for operation of the pistons 17 of the actuator 15.

The comparator 30 is also connected so as to control a by-pass valve 22, which is interposed between the torque motor/control valve combination 14 and the hydraulic actuator 15, connected to a visible and/or audible warning indicator 23 and connected to an auto-change over arrangement 24 which may be in the form of an electromagnetic relay.

The arrangement thus far described, with the exception of the automatic change over arrangement 24 forms the subject of our co-pending patent application Ser. No. 557,092.

A further, duplicate, system for controlling the position of elevator 19 is provided comprising a pick-off device 12' associated with the manually operable lever 11 so as to sense the position thereof has its portion 12a' connected to provide corresponding electrical position signals as an input to an amplifier 13'. The output of amplifier 13' is connected so as to provide position control signals to a control valve 14' associated with a second cylinder 16' of the hydraulic actuator 15.

The cylinder 16' contains a piston 17' which is rigidly mounted on the piston rod 18. A pick-off device 20' which is arranged to provide electrical output signals representative of the position of the piston rod 18 is connected via its portion 20a' so as to feed such positional signals as a further input to amplifier 13'. Thus there is provided a duplicate servo loop system, the output of amplifier 13 being reduced to zero when the piston rod 18 reaches a required position as determined by the manually operable lever 11.

The portion 12b' of pick-off 12' associated with the manually operable lever 11 produces electrical output signals representative of the position of the manually operable lever 11 which are fed as an input to a comparator 30'. A portion 20b' of the pick-off 20' provides electrical output signals representative of the position of the piston rod 18 and is connected so as to provide a further input for the comparator 30'. The comparator 30' has a similar delay means built in it as that for comparator 30. The comparator 30' is connected so as to control the operation of a throttle valve 21' which is connected between the torque motor/control valve combination 14' and pressure input and exhaust lines referenced P' and E' respectively which provide the hydraulic power for the operation of piston 17' of the actuator 15.

The comparator 30' is also connected so as to control a by-pass valve 22' which is interposed between the torque motor/control valve combination 14' and the cylinder 16' of the hydraulic actuator 15.

The output of the amplifier 13' is also fed via a lead 25 and a switch S1 to operate a servo motor 26. The output shaft of servo motor 26 has associated therewith a pick-off 27 which provides from its portions 27a and 27b electrical signals representative of the integral of the input to the servo motor 26, the signals from the portion 27a being fed as a further input for the amplifier 13' and the signals from portion 27b being fed to the comparator 30' to complement the signals fed from portion 20b' of pick-off 20'.

The switch S1 is controlled via a lead 28 from the automatic change over arrangement 24 which also has a control input to a by-pass valve 22' via lead 29.

In operation of the system movement of the manually operable member 11 produces an elevator demand signal which is fed from the pick-off 12 at its portion 12a to the amplifier 13. This signal is fed via the torque motor/control valve combination 14 to control the position of the piston 17 in the chamber 16 and hence the position of elevator 19 via the piston rod 18. Positional signals representative of the position of the piston rod 18 are fed back to the amplifier 13 and when the elevator 19 is in the required position as determined by the manually operable member 11 the output signals from the amplifier 13 are reduced to zero. At the same time a comparison demand signal is fed from the portion 12b of pick-off 12 to the comparator 30. This comparison demand signal is compared with the positional signals from the portion 20b of the pick-off 20.

At this time the second control arrangement of the system is operating in the standby mode with the switch S1 closed and hence the output of amplifier 13' being reduced to zero via the servo motor 26, the by-pass valve 22' being in a position such that the two sides of the chamber 16' on either side of the piston 17' are interconnected and hence the piston 17' having no control over the position of the piston rod 18.

When the comparator 30 determines an error above a predetermined amount between the two sets of positional signals fed thereto it causes the throttle valve 21 to reduce the pressure in the pressure lead P so reducing the effectiveness of the torque motor/control valve 14 and reducing the amount of movement of elevator 19. At the same time the transfer function in the delay means of comparator 30 is varied such that the difference between the elevator demand signal and the positional signals representative of the position of the piston 18 caused by the throttle valve 21 is compensated for.

When the error between the comparison demand signals and the position signals from pick-off 20 increase above a predetermined higher value the comparator 30 causes the by-pass valve 22 to connect the two sides of the chamber 16, which are divided by the piston 17, together and hence disconnects the control system for controlling the position of elevator 19. At the same time the warning indicator 23 is actuated to show that the control system has been disconnected and automatic changeover arrangement 24 is actuated.

Automatic changeover arrangement 24 via its lead 29 causes by-pass 22' to be moved such that the two sides of the chamber 16' divided by the piston 17' are no longer interconnected. At the same time the switch S1 is caused to open under control of a signal along lead 28 and hence the feedback derived from the servo motor 26 to the amplifier 13' and the comparator 30' is discontinued.

The control of the movement of elevator 19 is now taken over by the second control system, amplifier 13' and torque motor/control valve combination 14' etc. which operates in like manner to that described for the first control arrangement, amplifier 13 and torque motor/control valve combination 14 etc.

It will be seen that the inclusion of the servo motor arrangement 26 serves the dual function of ensuring that the change over of control is as smooth as posible i.e. by having the output of amplifier 13', when in its standby mode, at zero, and also of preventing the comparator 30' from positioning the by-pass valve 22' to connect the two sides of the cylinder 16' irrevocably due to a positioning fault caused by the control of the first system.

Although the input to the servo motor 26 via lead 25 is shown as being taken from the output of amplifier 13' it could be derived from an additional amplifier to which the signals from portions 12a' of pick-off 12' and portion 20a' of pick-off 20' are fed. Such an arrangement could be preferable for example if the output from signal 13' was not of sufficient power to drive the torque motor/control valve combination 14' and the servo motor 26.

With the arrangement shown in FIGURE 1 on changeover from the first control arrangement controlling the position of elevator 19 to the second control arrangement controlling the position of elevator 19 the signals stored by the servo motor 26 whilst the second control arrangement was operating in a standby mode results in a datum error between the member 11 and the elevator 19. This datum error is acceptable for most applications but in order to disclose a system suitable for applications in which such datum error is not acceptable two methods are hereinafter disclosed for removing such datum error.

Firstly such datum errors can be removed by the inclusion of a separate wash-out filter, of relatively low time constant (five seconds) between pick-off portion 27a and amplifier 13' and between pick-off portion 27b and comparator 30'.

Referring now to FIGURE 2 there is shown a modified form of the second control arrangement which will remove said datum errors. In the modified arrangement the output from amplifier 13' is fed via a further amplifier 28 to the torque motor/control valve combination 14'. The output from amplifier 13' is also fed via the switch S1, which in this arrangement comprises a change over switch, and via a further amplifier 29 to the servo motor 26. The output from pick-off portion 27a as well as being fed to the amplifier 13' is also fed to the other contact of changeover switch S1 so that when the second control arrangement is changed from its standby mode of operation and is caused to take over control of the positioning of elevator 19 switch S1 completes a feedback circuit for the servo motor 26, so causing the stored signal in the servo motor 26 to be ineffective i.e. reduced to zero.

Although the embodiments of the invention disclosed relate to the control of an elevator in an aircraft it should be realised that these arrangements could be used for any duplicate monitored control system for controlling the movement of a member.

I claim:

1. A control system comprising at least two separate control means, one for controlling the positioning of a member and the other operates in a standby mode, changeover means connected between said two control means for causing, when activated, said other control means to take over control of the positioning of the member, separate monitoring means coupled with each control means, each monitoring means comprising a summing amplifier; required position signal producing means connected to the summing amplifier for supplying thereto a signal representative of a required position of said member; actual position signal producing means coupled between said member and the summing amplifier for supplying thereto a signal representative of the actual position of the member; and comparator means coupled to said signal producing means and receiving inputs representative of said signals and coupled to said two control means for causing one control means to become inoperative and the other control means to become operative upon the determination of a predetermined error between said signals, the system further comprising compensating means coupled to the monitoring means of said other control means, for compensating while said one control means is operating, for errors between said signals resulting from incorrect positioning of said member under control of said one control means.

2. A control system as claimed in claim 1 wherein said compensating means comprises an integrator, means coupled between said amplifier and said integrator for applying as the input to the integrator the output from the associated amplifier, means coupled between the integrator and the amplifier for applying the output from the integrator as a further input to the amplifier for compensating for an error which may be detected in the amplifier, and means coupled between the integrator and the comparator for applying the output from the integrator also as a compensating input to the associated comparator.

3. A control system as claimed in claim 2 wherein the output from the integrator is effective to reduce to zero the output from the amplifier.

4. A control system as claimed in claim 2 wherein eliminator means are provided for eliminating any datum errors produced in the integrator whilst said other control means is operating in a standby mode, and means coupled with said changeover means for rendering said eliminator means operable when said other control means is caused to take over control of positioning said member.

5. A control system as claimed in claim 4 wherein said eliminator means comprises a wash-out filter of relatively low time constant in the output circuit from the integrator.

6. A control system as claimed in claim 4 wherein said eliminator means comprises a feedback loop connected between the integrator output and the integrator input when said other control means is caused to take over control of positioning said member, the feedback loop being then effective to reduce the integrator output to zero.

7. A control system a sclaimed in claim 4 wherein the integrator is a servo motor which is driven by the position control output signal, the integrated signal or signals being derived from a pick-off or pick-offs associated with the shaft of the motor.

References Cited

UNITED STATES PATENTS

| | | | |
|---|---|---|---|
| 2,996,651 | 8/1961 | Hammell | 318—489 |
| 3,100,861 | 8/1963 | Osder | 318—489 |
| 3,149,272 | 9/1964 | Dendy | 318—28 |

BENJAMIN DOBECK, Primary Examiner

U.S. Cl. X.R.

318—28